United States Patent Office 2,907,709
Patented Oct. 6, 1959

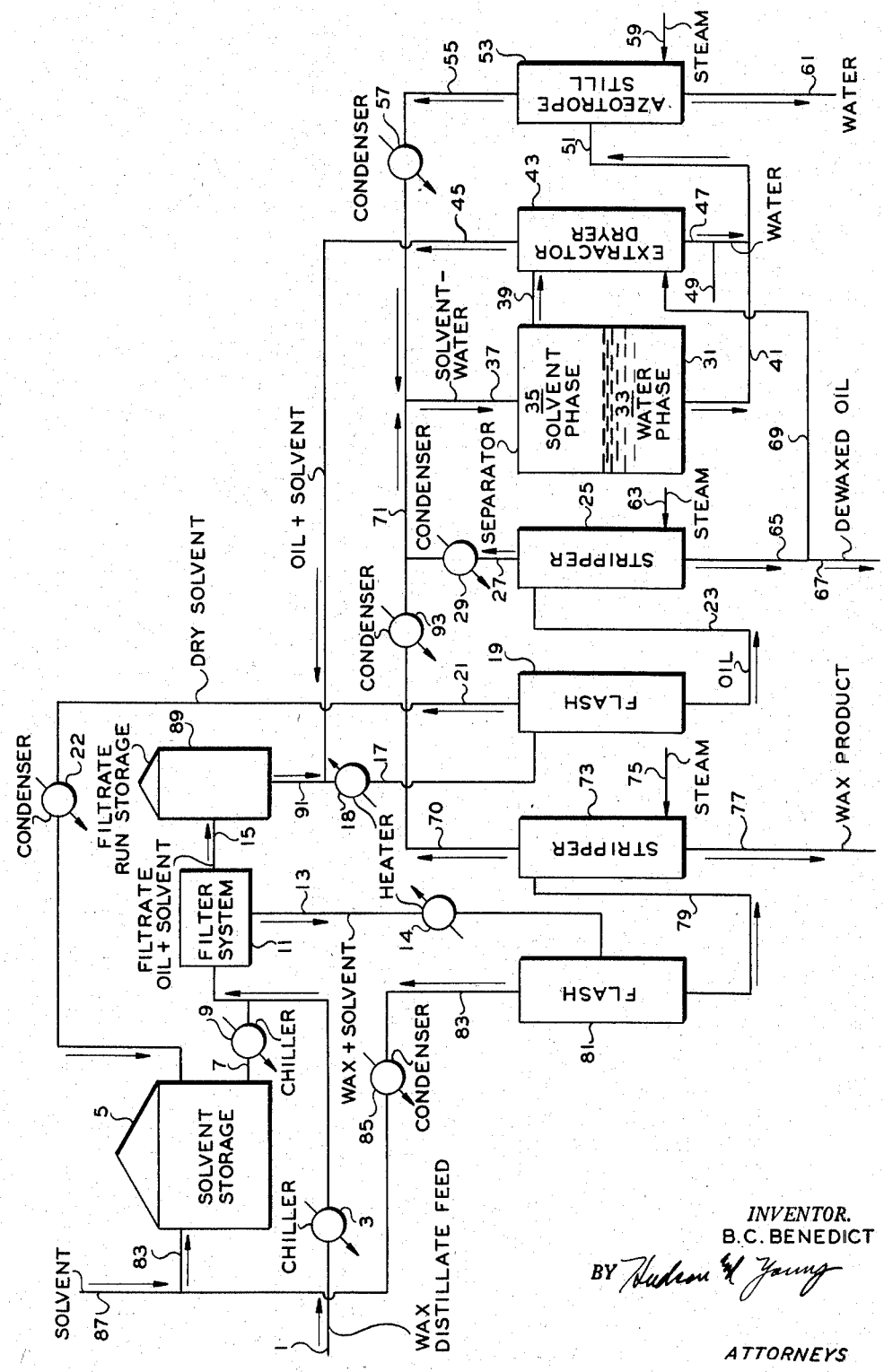

2,907,709

METHOD OF DRYING A DEOILING SOLVENT BY CONTACTING WITH A PORTION OF DEWAXED OIL

Bruce C. Benedict, Bartlesville, Okla., assignor to Phillips Petroleum Company, a corporation of Delaware Application April 11, 1956, Serial No. 577,475

6 Claims. (Cl. 208—31)

This invention relates to a method for the operation of deoiling processes in the separation of wax and oil from mixture of the two. In one aspect it relates to deoiling of wax precipitated from waxy oils in wax-oil separation processes. In another aspect it relates to a method of dehydrating an aqueous oil diluent or solvent used in deoiling wax precipitated from waxy oils in the absence of or in the presence of the diluent or solvent.

An object of this invention is to provide an improved deoiling process for separation of wax and oil from mixtures of the two.

Another object of this invention is to provide an easily operable method for deoiling wax precipitated from waxy oils in the absence of or in the presence of diluent or solvent.

Still another object of my invention is to provide such a deoiling process in which aqueous oil diluent or solvent is dehydrated without use of conventional salt towers.

Yet another object of my invention is to provide a unitary wax separation and recovery process in which wax is precipitated from the waxy oil in the absence of or in the presence of a dewaxing diluent or solvent and employing my improved wax deoiling step therein.

Still other objects and advantages of my invention will be realized by those skilled in the art upon reading the following description which, taken with the attached drawing, forms a part of this specification.

While my novel "deoiling of wax" process is exemplified herein specifically in a process for the treatment of a wax and oil mixture for the production of an oil-free wax product, my "deoiling of wax" process is equally applicable in processes for treatment of wax and oil mixtures for the production of wax-free oil products.

The invention finds particular use in the treatment of wax and oil mixtures in the production of candlewax, paper coating wax, etc. and, in the production of lubricating oils, diesel fuel stocks produced from waxy petroleum oils, and many other oils requiring dewaxing.

In many instances in wax-oil separation operations it is advantageous to chill the waxy oil to crystallize the wax in the oil prior to addition of diluent or solvent. In such cases the precipitated wax is easier to filter and to deoil than when the wax is precipitated from an oil-diluent mixture. Most prior art methods of dewaxing involve addition of a diluent, for example, liquid propane, methylethylketone or a diluent mixture such as, for example, acetone and benzene, to the waxy oil, with the addition of heat to effect solution, followed by chilling and wax precipitation. The wax of some wax-containing oils when so precipitated is not easy to filter from the oil-diluent mixture, and deoiling the oily wax with diluent wash is a difficult operation because the wax crystals are of such form as to form a compact, non-permeable filter bed.

A prior art method has been described in which a waxy oil is chilled to precipitate the wax in the absence of a conventional dewaxing diluent. The diluent or washing agent is then added to expedite removal of the oil from the precipitated wax. While a major proportion of the diluent for example, methylethylketone, can be removed from the washed wax and from the filtrate by flashing, final traces of the diluent usually have to be removed by steam stripping. When stripping with steam the stripped diluent, upon condensation, is an aqueous diluent solution, in case the diluent and water are soluble in each other. When methylethylketone is employed as the diluent and wash liquid, steam stripping of the wax and of the dewaxed oil yields methylethylketone-water solutions. Methylethylketone and water distill as an azeotrope and the excess of water over that required to form the azeotrope is removed from the kettle of the still. The azeotrope is passed through a salt tower for removal of the water and dehydration of the diluent, after which treatment the dehydrated diluent is ready for reuse in the system. Such an operation is described in Jenkins 2,397,868, and this patentee employs salt towers for final drying steps.

The use of salt towers for drying water-containing materials has many disadvantages, one being consumption of the salt in the form of brine. Disposal of such brine is frequently a problem. Sediment from the salt bed is carried from the tower with the dried material. Salt beds tend to cake and channel with the result that drying is frequently inefficient. Rusting of equipment from contact with the brine produced causes high maintenance costs.

One prior art method for dehydrating aqueous dewaxing diluent utilizes waxy oil feed stock to a wax-oil separating system for extracting the diluent from a diluent-water solution produced in the operation. This type of operation is disadvantageous because it introduces the diluent into the wax-oil charge stock prior to crystallization of the wax. As mentioned hereinbefore, it is preferable in some cases not to add diluent to the wax-oil stock prior to crystallization of the wax.

I solve this problem by employing at least a portion of the final wax-free oil for extracting diluent from the diluent-water solution and then I remove in a simple flashing operation the recovered diluent from the oil. More particularly, my invention includes a process for dehydrating an oil dewaxing diluent-water mixture comprising contacting said mixture with a wax-free oil, from this contacting operation separating an oil-diluent phase and a liquid water phase, flash vaporizing diluent from the oil-diluent phase to produce a vaporous diluent phase and an oil phase, condensing the vaporous diluent phase as the dehydrated diluent product of the process.

I use throughout these specifications and claims the terms "solvent" and "diluent" interchangeably. The term "washing agent" is also sometimes used in place of diluent or solvent. In my wax and oil separation operations, I use methylethylketone as a diluent or washing agent. Other diluent or washing agents can under some conditions be used, but most of the other diluents possess disadvantages and are not widely used. For example, acetone dissolves only relatively small proportions of wax, and similarly it dissolves only correspondingly small portions of oil. Thus, if acetone were used in wax deoiling operations excessively large quantities of acetone would be required to wash the oil from the wax, and the large quantities of acetone would dissolve relatively large amounts of wax, and this solution wax remains in the oil with the resultant loss in wax yield. In oil production, wax carried into the oil in this manner results in a high pour point oil. Ketones of higher molecular weight than methylethylketone are not as easily removed by flashing from the wax or from the oil as is methylethylketone, hence their use is sometimes undesirable. Water is in general only slightly soluble in the higher molecular weight ketones and hence when they are used they do not present the water solubility problem as does methylethylketone. Oil is soluble in methylethylketone, thus requiring only a minimum amount of the solvent for washing the oil from the wax.

Methylethylketone is relatively easily removed from the wax and from the oil filtrate in a low-temperature flashing operation. The remainder or final trace of ketone is removed by steam stripping. It is this steam stripping which forms the methylethylketone-water solution from which the water must be removed before the methylethylketone is suitable for reuse in the system. As mentioned above, I employ a portion of the final wax-free oil product for extracting methylethylketone from the ketone-water solution and then flash vaporize the major portion of the ketone from the oil as dry ketone suitable for reuse in the system.

In the drawing, the figure illustrates in diagrammatic form, an arrangement of apparatus parts suitable for carrying out the operation of my process.

Referring now to the drawing, reference numeral 1 identifies a pipe through which a wax distillate or a waxy oil feed stock flows from a source, not shown, into my system. This oil is chilled in a chiller 3 for precipitation of the wax in the presence of only the oil. Diluent or solvent from a storage tank 5 is passed through a pipe 7 to a chiller 9 in which it is chilled to substantially the same temperature as that imparted to the waxy oil in chiller 3. The chilled solvent is added to the chilled wax-containing oil in pipe 1 and the mixture is passed into a filter system 11. Filter systems such as that required herein are conventional in the art, and the system will not be described in detail for purposes of brevity. The system, however, includes one or more filters and one or more washing steps in which the wax cake is washed with fresh diluent so that wax passing from the filter system through a pipe 13 is free from oil. This wax cake is heated and melted in a heater 14 and the melt is passed into a flash vessel 81. In flash vessel 81 the solvent, methylethylketone, is flashed from the wax and the flash vapors are passed through a pipe 83 and are condensed in a condenser 85, the condensate being passed on into the solvent or diluent storage 5. This flashing operation removes the majority of the methylethylketone, and in order to remove final traces of the ketone the flash vessel bottoms are passed through a pipe 79 into a stripper 73 into which steam is introduced from a pipe 75. The methylethylketone-steam vapors are passed through a pipe 70 and are condensed in a condenser 93, the condensate being passed through pipes 71 and 37 into a phase separating vessel 31. Wax, free of diluent, is removed from the stripper 73 and is passed to a wax storage, not shown, through a pipe 77 as one product of the process.

The combined filtrate and diluent-oil washings from the filter system 11 are passed by way of a pipe 15 into a filtrate run storage tank 89. From this run storage tank filtrate is passed through some pipes 91 and 17, being heated in a heater 18, into a flash vessel 19 in which diluent or solvent is flash vaporized from the dewaxed oil. The flash vapors are removed from flash vessel 19 by way of a pipe 21 and are condensed in a condenser 22 en route to the diluent storage tank 5. The flash vessel bottoms still contain at least a trace of solvent and this material is passed through a pipe 23 into a stripper tower 25 in which steam from a pipe 63 removes the final traces of diluent from the oil. The stripper bottoms, free of solvent, is removed through some pipes 65 and 67 and is passed therefrom to oil storage, not shown. The stripper overhead vapors of steam and solvent are condensed in a condenser 29 and condensate is passed on through pipes 27, 71 and 37 into the phase separator 31. In the phase separator 31 a water-rich phase 33 settles to the bottom and a solvent-rich phase 35 floats on the water-rich layer. The solvent-rich phase is passed through a pipe 39 into an extraction vessel 43. At least a portion of the finished oil from pipe 65 is passed through a pipe 69 and is introduced into the lower portion of the extraction vessel 43. In this vessel the oil and extracted ketone flow upward while water settles to the bottom for removal through a pipe 47. Wax-free oil containing diluent or solvent in solution, as an extract phase, is removed through a pipe 45 and is combined with the filtrate in pipe 91 and the mixture is passed through the heater 18 and pipe 17 into the flash vessel 19 for removal of the diluent extracted from the solvent-rich phase and for removal of diluent from the filtrate. The unextracted material which comprises largely water and containing a minor amount of diluent, as a raffinate phase, is removed from extractor vessel 43 through a pipe 47 and is passed on through a pipe 51 into an azeotrope still 53. In this azeotrope still temperature and pressure conditions are maintained such that an azeotrope of methylethylketone and water is removed as overhead vapors through a pipe 55, and the water, in excess over that required to form the azeotrope, being removed from the still through a pipe 61. Steam for this azeotrope distillation operation is introduced through a pipe 59. The azeotrope vapors are condensed in a condenser 57 and condensate is combined with the methylethylketone and water from pipe 71 and the mixture is passed through the pipe 37 to the separator 31. Phase separation in this vessel takes place as previously described. A pipe 49 is connected with pipe 47 for removal of water from the system in case the water (raffinate) phase from extractor 43 is free from diluent.

Methylethylketone has a normal boiling point of approximately 175° F., and heaters 18 and 14 are operated to heat the materials passing therethrough so that upon entry of the materials into their respective flash tanks the major portions of the methylethylketone are flash vaporized. It is preferred to flash vaporize the major portions of the methylethylketone in this manner because the methylethylketone so separated and recovered is substantially dry, that is, free of water, and after condensation is suitable for reuse. The strippers 25 and 73 are so operated in regards to temperature and pressure and rate of steam introduction that the final traces of methylethylketone are removed from the oil and from the wax product. The azeotrope still 53 is similarly operated; that is, it is operated as regards to temperature, pressure, and rate of steam introduction so that all of the methylethylketone is recovered overhead as an azeotrope and only water is removed from the bottom of the still. The operation of such flash vessels, strippers and azeotrope stills are well understood by those skilled in the art and their details of operation are therefore not given.

One of the important advantages of my process is that the diluent methylethylketone is recovered by an oil which is not the waxy feed oil to the process, thereby permitting crystallization of wax in the absence of diluent and thus the formation of the type of wax crystals for most efficient filtration and washing. By my process the waxy distillate is fully chilled and the wax crystals are fully formed prior to the addition of any of the diluent.

Another advantage of my system is that the diluent recovery system can be operated independently of the wax precipitation system; that is, the diluent recovery system can be operated on filtrate from the filtrate run storage tank 89 at times when the wax chiller or crystallizer and filtration system are not in operation.

Still another advantage of my process is that because the dryer or extraction tower 43 is operated with wax-free oil, any amount of filtrate, that is wax-free oil-diluent solution, can be treated for diluent recovery.

As examples of the operability of my process two runs were made using a Podbielniak contactor for effecting the extraction of methylethylketone from aqueous methylethylketone by Stoddard solvent. Substantially pure water was removed from the contactor and refractive index measurements thereon indicated that the removed water phase was substantially pure water, that is free from methylethylketone and the Stoddard solvent-ketone phase contained substantially no water. In the following tabulation are the data resulting from the two runs using the Podbielniak contactor as the liquid contacting unit.

Table 1

|  | Run No. 1 | Run No. 2 |
|---|---|---|
| Volume ratio wet MEK to Stoddard Solvent | 0.685 | 1.60 |
| Charge Rate to Contactor, wet MEK, lbs./hr | 9.78 | 9.78 |
| Products of Contactor: |  |  |
| Water phase, lbs./hr | 1.271 | 1.271 |
| MEK phase, lbs./hr | 8.51 | 8.51 |
| Charge Rate, Stoddard Solvent, lbs./hr | 13.50 | 5.50 |
| Yield: |  |  |
| Stoddard Solvent, ketone phase, lbs./hr | 22.1 | 14.0 |
| Water phase, lbs./hr | 0.786 | 0.892 |
| Percent Recovery (total liquids) | 98.63 | 97.44 |

These above data illustrate that petroleum hydrocarbon material, of which Stoddard solvent is representative, does extract methylethylketone efficiently from a methylethylketone-water mixture.

In the following example are given data of the process as illustrated in the drawing in which flow rates and compositions are given.

Table 2

| Vessel or Pipe | Material | Gal. per hour |
|---|---|---|
| 1 | Wax distillate feed | 818 |
| 9 | Methylethylketone | [1] 3,871 |
| 13 | Methylethylketone | 480 |
|  | Wax+oil | 414 |
| 15 | Methylethylketone | 1,090 |
|  | Dewaxed oil | 404 |
| 79 | Wax | 414 |
|  | Methylethylketone | 45 |
| 83 | Methylethylketone | 435 |
| 77 | Wax product | 414 |
| 75 | Steam | [2] 28 |
| 70 | Methylethylketone | 45 |
|  | Steam | [2] 28 |
| 23 | Oil | 404 |
|  | Methylethylketone | 45 |
| 21 | Methylethylketone | 1,045 |
| 67 | Dewaxed oil product | 404 |
| 63 | Steam | [2] 28 |
| 27 | Methylethylketone | 45 |
|  | Steam | [2] 28 |
| 39 | Methylethylketone | 40.6 |
|  | Water | 13.2 |
| 41 | Methylethylketone | 9.4 |
|  | Water | 42.8 |
| 43 | Wet ketone/oil ratio=1.6 | 80.6 |
| 45 | Methylethylketone | 58.5 |
|  | Dewaxed oil | 9.4 |
| 41 | Methylethylketone | 21.4 |
|  | Water | 9.4 |
| 55 | Methylethylketone-water (azeotrope) | 1.5 |
| 59 | Steam | [2] 2 |
| 61 | Water | 21.9 |

[1] 2644 g.p.h. of this MEK containing 419 g.p.h. of oil is preliminary wash.
[2] Steam on a liquid water basis.

Temperatures, pressures and other operating conditions are not given because the selection of these is well understood by those skilled in the art. Also auxiliary apparatus as pumps, valves, and pressure and temperature indicating and control apparatus and flow control apparatus are not illustrated in the drawing nor described in the specification for purposes of brevity. The need for such equipment, its installation and operation are well understood by those skilled in the art.

While certain embodiments of the invention have been described for illustrative purposes, the invention obviously is not limited thereto.

I claim:

1. A process for dehydrating an oil dewaxing diluent-water mixture comprising contacting said mixture with a dewaxed oil, from this contacting operation separating a dewaxed oil-diluent phase and a liquid water phase, flash vaporizing diluent from said oil-diluent phase to produce a vaporous diluent phase and an oil phase, condensing the vaporous diluent phase as the dehydrated diluent product of the process.

2. In the process of claim 1 wherein the diluent is methylethylketone.

3. A method for recovering a dry wax deoiling diluent from a dewaxed oil-diluent mixture comprising flash vaporizing at least a portion of said diluent from said mixture, steam stripping the remainder of the diluent from the flash bottoms, condensing the steam-stripped diluent and steam and separating a diluent-rich phase of substantially only diluent containing dissolved water and a water-rich phase of substantially only water containing dissolved diluent from the condensate, withdrawing dewaxed oil free of diluent from the steam stripping operation, dividing this withdrawn oil into two portions, contacting said diluent-rich phase with one portion of the withdrawn diluent-free oil, from this contacting operation separating an oil-diluent phase as an extract phase and a water phase as a raffinate phase, adding said extract phase to the dewaxed oil-diluent mixture prior to the flash vaporizing operation and withdrawing the raffinate phase, distilling the water-rich phase to produce overhead vapors of diluent and water, condensing these overhead vapors and passing the condensate into the phase separation operation and removing additional water as a still bottoms product, condensing the flash vaporized diluent, recovering the condensed diluent as product, and withdrawing the second portion of the dewaxed oil as an additional product of the process.

4. In the process of claim 3, wherein the diluent is methylethylketone.

5. A continuous process for deoiling wax of a waxy feed oil comprising chilling the feed oil to a wax precipitation temperature, chilling methylethylketone to substantially said temperature, mixing the chilled methylethylketone and chilled feed, filtering precipitated wax from the mixture to produce a wax containing a minor amount of methylethylketone and oil and a filtrate comprising dewaxed oil and methylethylketone, flash vaporizing the methylethylketone from the wax-methylethylketone-oil mixture to produce a first methylethylketone flash vapor, steam stripping the remainder of the methylethylketone from the flash wax bottoms, to produce a first vaporous water-methylethylketone mixture condensing this first vaporous mixture and introducing the condensate into a phase separation step subsequently described, flash vaporizing the methylethylketone of said filtrate thereby producing a flashed oil containing a minor proportion of methylethylketone and a second methylethylketone flash vapor, steam stripping the flashed oil to produce a methylethylketone-free oil and a second vaporous water-methylethylketone mixture, condensing this latter vaporous water-methylethylketone mixture, combining this latter formed condensate with the forementioned condensate prior to introducing the first-mentioned condensate into said phase separation step and therein separating a methylethylketone-rich phase containing water and a water-rich phase containing methylethylketone, azeotropically distilling said water-rich phase to produce a methylethylketone-water azeotrope and adding said azeotrope to the aforementioned condensates prior to the phase separation, withdrawing water from the azeotrope distillation operation, extracting methylethylketone from said solvent-rich phase by contacting the same with at least a portion of said ketone-free oil, from this extraction operation separating an extract phase comprising the latter mentioned oil and methylethylketone and a raffinate phase comprising water, combining said extract phase with said filtrate prior to its flash vaporization, condensing the first and second methylethylketone flash vapors and returning this latter condensate to the second mentioned chilling step, withdrawing the methylethylketone-free wax and the remaining portion of methylethylketone-free oil as the main products of the process.

6. A continuous process for deoiling a wax-oil mixture with methylethylketone comprising the steps of washing a chilled precipitated wax-oil mixture with chilled methylethylketone thereby producing a wax fraction containing at least a minor proportion of methylethylketone and oil and an oil filtrate containing methylethylketone, flash vaporizing methylethylketone from said wax fraction thereby producing a flashed wax containing a minor proportion of methylethylketone and a first methylethylketone flash vapor, steam stripping the said flashed wax to produce a ketone-free wax and a first vaporous water-methylethylketone mixture, flash vaporizing said oil filtrate containing methylethylketone thereby producing a flashed oil containing a minor proportion of methylethylketone and a second methylethylketone flash vapor, steam stripping said flashed oil to produce a methylethylketone-free wax depleted oil and a second vaporous water-methylethylketone mixture, condensing the first and second vaporous water-methylethylketone mixtures, from the condensed material separating a methylethylketone-rich phase containing water and a water-rich phase containing methylethylketone, azeotropically distilling said water-rich phase and adding a water-methylethylketone azeotrope produced thereby to said material prior to the phase separation, withdrawing water from the azeotropic distillation operation, extracting methylethylketone from said methylethylketone-rich phase containing water by contacting same with at least a portion of said methylethylketone-free wax depleted oil, from this extracting operation separating an extract phase comprising wax-depleted oil and methylethylketone and a raffinate phase comprising water and methylethylketone, combining said extract phase with said oil filtrate prior to flash vaporizing said oil filtrate, combining said raffinate phase with said water-rich phase containing methylethylketone prior to the azeotrope distillation step, condensing the first and second methylethylketone flash vapors and returning these latter condensates to the washing step and withdrawing the methylethylketone-free wax and the remaining portion of the methylethylketone-free oil as products of the process.

References Cited in the file of this patent
UNITED STATES PATENTS

| | | |
|---|---|---|
| 2,096,871 | Atkins | Oct. 26, 1937 |
| 2,137,587 | Poffenberger | Nov. 22, 1938 |
| 2,220,200 | Blackly | Nov. 5, 1940 |
| 2,229,658 | Jenkins | Jan. 28, 1941 |
| 2,397,868 | Jenkins | Apr. 2, 1946 |
| 2,443,532 | Berg | June 15, 1948 |
| 2,550,058 | Gee | Apr. 24, 1951 |
| 2,625,502 | Backlund | Jan. 13, 1953 |
| 2,742,401 | Kinchen | Apr. 17, 1956 |